United States Patent
Angliss et al.

(10) Patent No.: US 6,870,903 B2
(45) Date of Patent: *Mar. 22, 2005

(54) METHOD AND APPARATUS FOR SELF-TESTING A CUSTOMER SERVICES TERMINAL AND FOR LOOP TESTING TELEPHONE LINES THAT ARE CONNECTED THERETO

(75) Inventors: Brian Edward Angliss, Northglenn, CO (US); James Michael Dougherty, Highlands Ranch, CO (US)

(73) Assignee: Carrier Access Corporation, Boulder, CO (US)

( * ) Notice: Subject to any disclaimer, the term of this patent is extended or adjusted under 35 U.S.C. 154(b) by 392 days.

This patent is subject to a terminal disclaimer.

(21) Appl. No.: 10/103,476

(22) Filed: Mar. 21, 2002

(65) Prior Publication Data

US 2002/0141542 A1 Oct. 3, 2002

Related U.S. Application Data

(60) Provisional application No. 60/279,910, filed on Mar. 29, 2001.

(51) Int. Cl.[7] .................................................. H04M 1/24
(52) U.S. Cl. ........................ 379/27.06; 379/26.02; 379/27.01; 379/1.01; 379/22
(58) Field of Search ...................... 399/26.02, 27.01, 399/29.01, 27.06, 27.08, 399.01, 29.04, 1.01, 29.05, 22, 22.03

(56) References Cited

U.S. PATENT DOCUMENTS 4,794,632 A * 12/1988 Burton et al. ................. 379/22
5,353,327 A * 10/1994 Adari et al. ................... 379/22

* cited by examiner

Primary Examiner—Curtis Kuntz
Assistant Examiner—Barry W Taylor
(74) Attorney, Agent, or Firm—Holland & Hart LLP

(57) ABSTRACT

A telecommunications system includes a telephone exchange and a customer services terminal whose input is connected to the telephone exchange, and whose plural outputs are individually connected to one of a plurality of telephone lines. A plurality of interface circuits within the customer services terminal are individually connected intermediate the input and one of the plural outputs. Self-test means provides for the testing of selected interface circuits. Loop-test means provides for the testing of selected telephone lines. A self-test relay is responsive to the self-test means and operates to disconnect the selected outputs from corresponding telephone lines as self-test conditions are applied to selected interface circuits as these interface circuits are disconnected from the selected telephone lines. The loop test means applies loop-test conditions to selected interface circuits, while the selected interface circuits and the corresponding outputs remain connected to the corresponding telephone lines. In either case, other interface circuits, outputs, and telephone lines that are not undergoing test remain operative to supply telecommunications services between the telephone exchange and these other telephone lines.

8 Claims, 7 Drawing Sheets a telecommunications system that includes the present invention, this system including a telephone

METHOD AND APPARATUS FOR SELF-TESTING A CUSTOMER SERVICES TERMINAL AND FOR LOOP TESTING TELEPHONE LINES THAT ARE CONNECTED THERETO

CROSS-REFERENCE TO RELATED APPLICATIONS

This non-provisional patent application claims the benefit of provisional patent application Ser. No. 60/279,910 filed Mar. 29, 2001, now abandoned, entitled TELECOMMUNICATIONS CUSTOMER SERVICES TERMINAL incorporated herein by reference.

Patent application Ser. No. 10/103,031 filed concurrently herewith entitled A CUSTOMER SERVICES TERMINAL METHOD AND APPARATUS FOR TESTING A PLURALITY OF INTERFACE CIRCUITS AND TELEPHONE LINES THAT ARE CONNECTED THERETO.

Patent application Ser. No. 10/102,759 filed concurrently herewith entitled GRAPHIC USER INTERFACE METHOD AND APPARATUS FOR TESTING A CUSTOMER SERVICES TERMINAL AND A PLURALITY OF TELEPHONE LINES THAT ARE CONNECTED THERETO, and incorporated herein by reference.

BACKGROUND OF THE INVENTION

1. Field of the Invention

This invention relates to the field of telecommunications, and more specifically to the self testing of a customer services terminal (CST) and to the loop testing of telephone lines that are connected to the CST.

2. Description of the Related Art

Telecommunications CSTs, also known as integrated access devices (IADs), are generally known.

However, the need remains in the art for a user friendly and web-based method and apparatus that facilitates testing both a CST and the telephone lines that are connected thereto while the CST is installed at a home or a small business to provide telecommunications services to telephone handsets and/or data terminals such as personal computers (PCs).

SUMMARY OF THE INVENTION

The present invention finds utility in a telecommunication system that includes a CST that supplies analog voice service and digital data service from a telephone exchange to a plurality of telephone handsets and/or data terminal CST-external s that are within the premises of a telecommunications user such as a home or a small business.

In a non-limiting embodiment of the invention, the multi-line output of a CST is connected to eight individual analog or voice telephone lines, and an input to the CST is connected to a carrier network by way of a symmetric digital subscriber line (SDSL or DSL), using asynchronous transfer mode (ATM) protocol with clocking for the CST being derived from the DSL.

Each of the eight CST-external telephone lines that are within the home or small business comprises a twisted pair of conductors; i.e., a ring lead and a tip lead. Each ring/tip pair serves as a single telephone line, and each ring/tip pair comprises a differential pair that carries bi-directional analog voice signals and/or bi-directional digital data signals to and from one of eight interface circuits that are within the CST, one interface circuit being provided for each ring/tip pair.

In an embodiment of the invention, the CST included an Ethernet connection by way of a 10Base-T Ethernet local area network (LAN) interface that included either an RJ-45 connector or an insulation displacement connector.

In such a telecommunications system, the present invention provides for the self-testing of the CST and the loop testing of the external telephone lines that are connected to the CST.

Testing includes (1) the loop testing of telephone lines that are external to the CST (also called foreign exchange lines, FX lines, or CST-external lines), (2) the self-testing of components that are internal to the CST and are associated with specific ones of the CST-external telephone lines, and (3) the self-testing of components that are internal to the CST and are not associated with any specific CST-external telephone line.

Multiple CST-external telephone lines and associated CST components can be selected for testing, and multiple tests can be selected. However, when multiple tests are selected, it is desirable that the selected tests are run serially, or one at a time.

Desirably, tests in accordance with the invention are completed within a short time duration (for example, less than one second) thus minimizing the chance that a telephone user at the home or small business will activate a telephone handset and thereby cause the handset to go off hook during a test, which off-hook event may have an adverse effect on the outcome of the test due to the low resistance that is presented by an off-hook handset, and due to the variable length of the transmission line that extends from the CST to the off hook handset.

In an embodiment of the invention, testing can be grouped into two groups; namely, the loop testing of CST-external telephone lines and the self-testing of components that are within the CST.

Loop-tests facilitate testing the CST-external telephone lines within the home or small business for shorts to external voltage sources, for shorts to ground potential, for a short across a CST-external telephone lines tip lead and ring lead, or for open circuits in a CST-external telephone lines tip lead or ring lead, this last test being facilitated with the help of an individual who is located at the home or small business.

Self-tests facilitate the testing of components that are internal to the CST including CST-internal tip leads and CST-internal ring leads that connect to the CST-external tip leads and CST-external ring leads.

The self tests (i.e., the CST tests) include direct current (DC) testing of loop closure between the CST ring and tip leads, DC testing of the CST ring lead to ground, DC testing of the CST ring lead to the CST tip lead, alternating current (AC) detection of the CST transmit gain and receive gain, AC testing of the CST trans-hybrid loss, and AC testing of the CST ringing signal.

In an embodiment of the invention, a computer that is located external to the CST utilizes a graphic user interface to facilitate the above-described self-testing and loop testing, selected self tests and/or selected loop test are performed on selected CST components and/or selected external telephone lines while the remainder of the CST components and the remainder of the external telephone lines remain operative to provide telephone service to the home or small business, and certain of the tests utilize a self-calibrating analog to digital converter (ADC).

BRIEF DESCRIPTION OF THE DRAWING

FIG. 8 is useful in describing certain self-tests that are applied to one or more of the eight FIG. 1 interface circuits selected using the FIG. 5 GUI.

Figure 1:
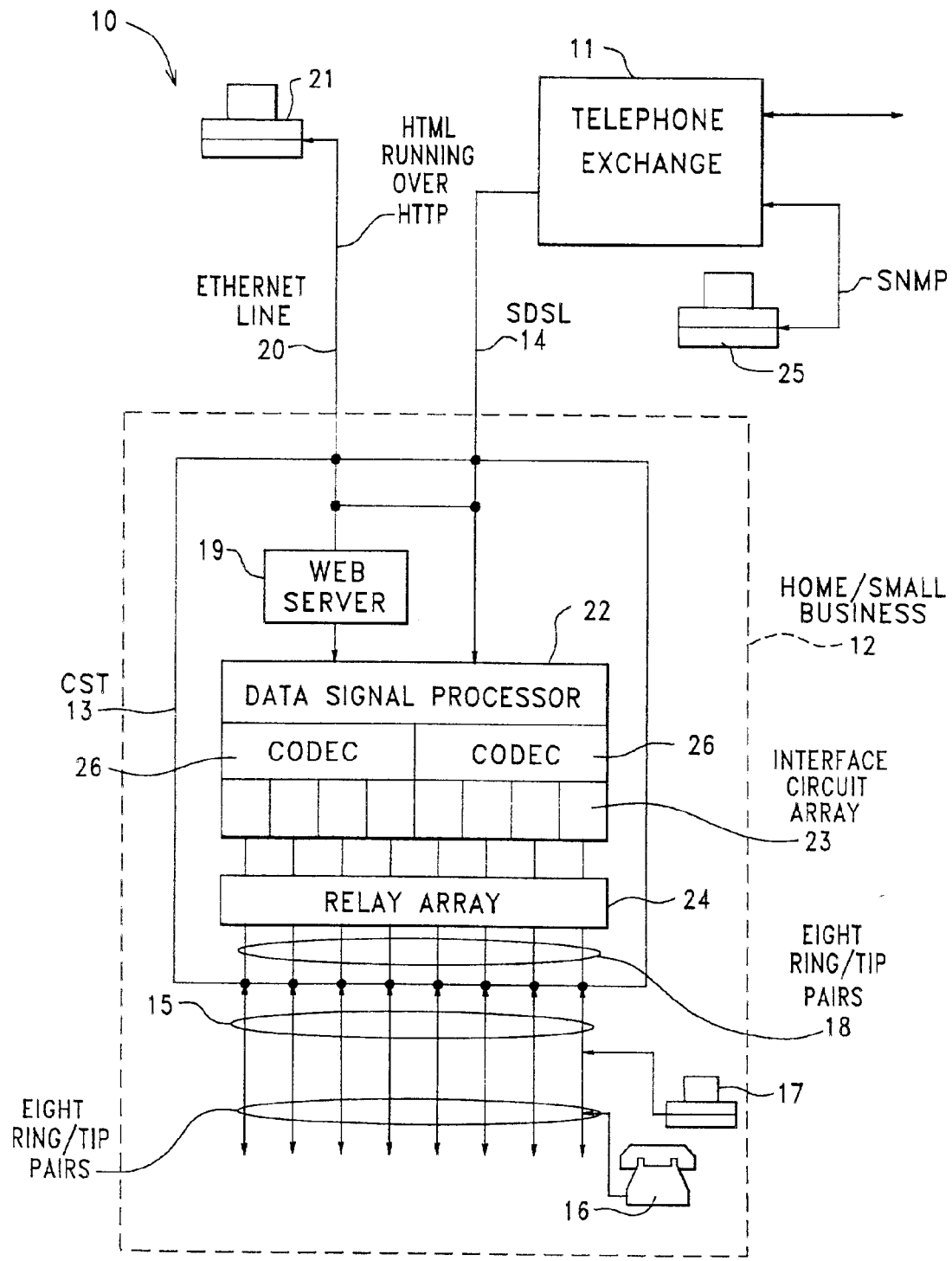
FIG. 1 shows a telecommunications system that includes the present invention, this system including a telephone exchange that supplies voice and data services to a home or small business whereat a CST is installed.
Figure 2:
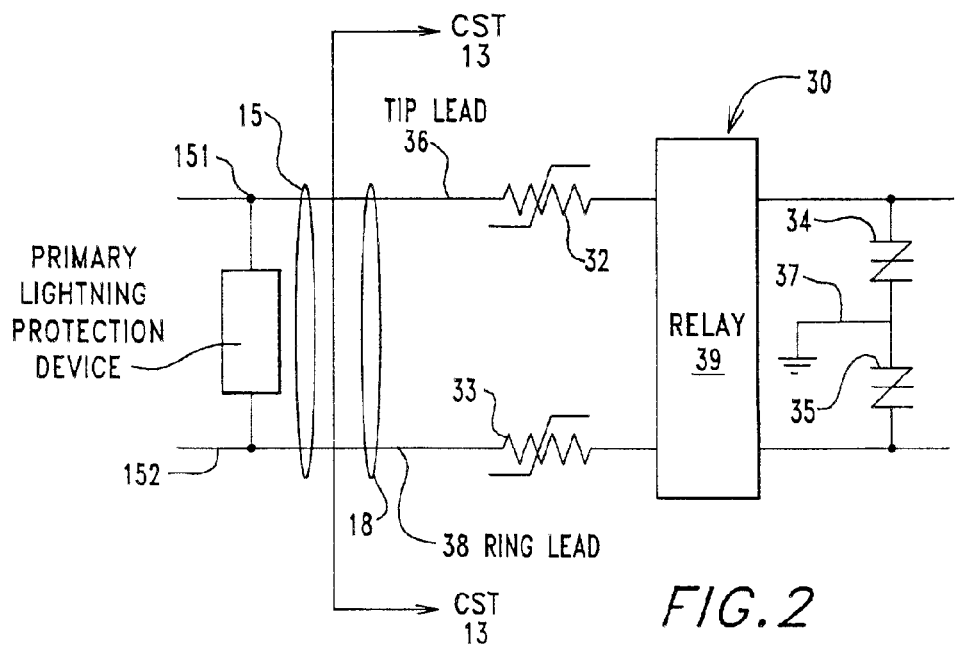
FIG. 2 shows a one-telephone line portion of the FIG. 1 CST that is connected to an external telephone line ring/tip twisted pair that extends from the CST into the home or small business.
Figure 5:
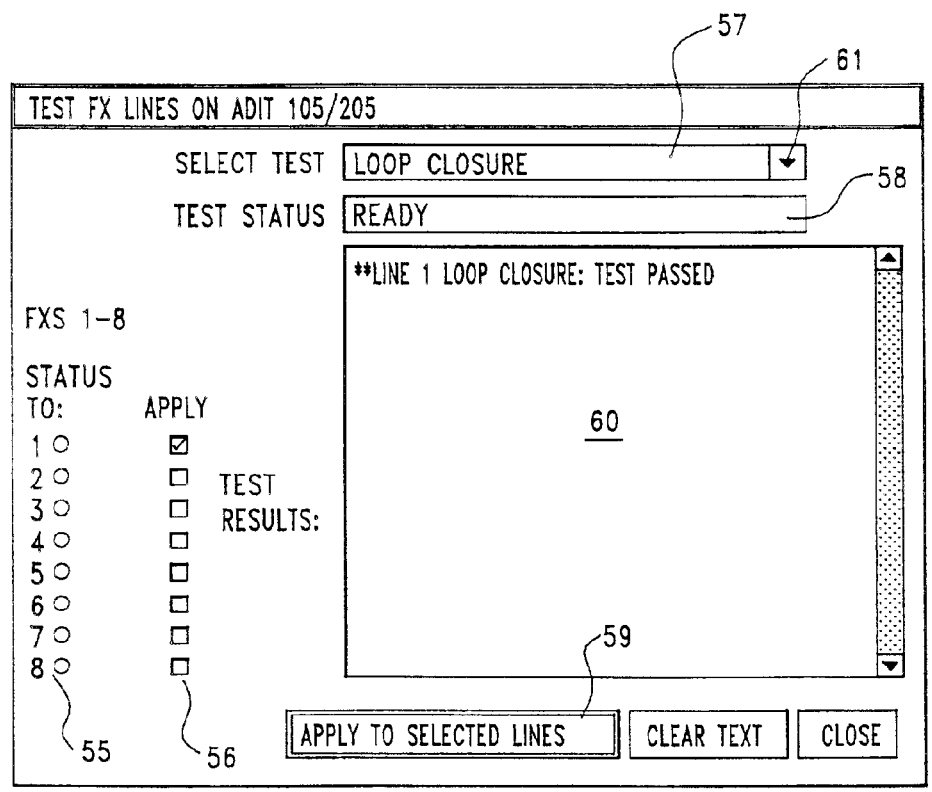
Figure 11:
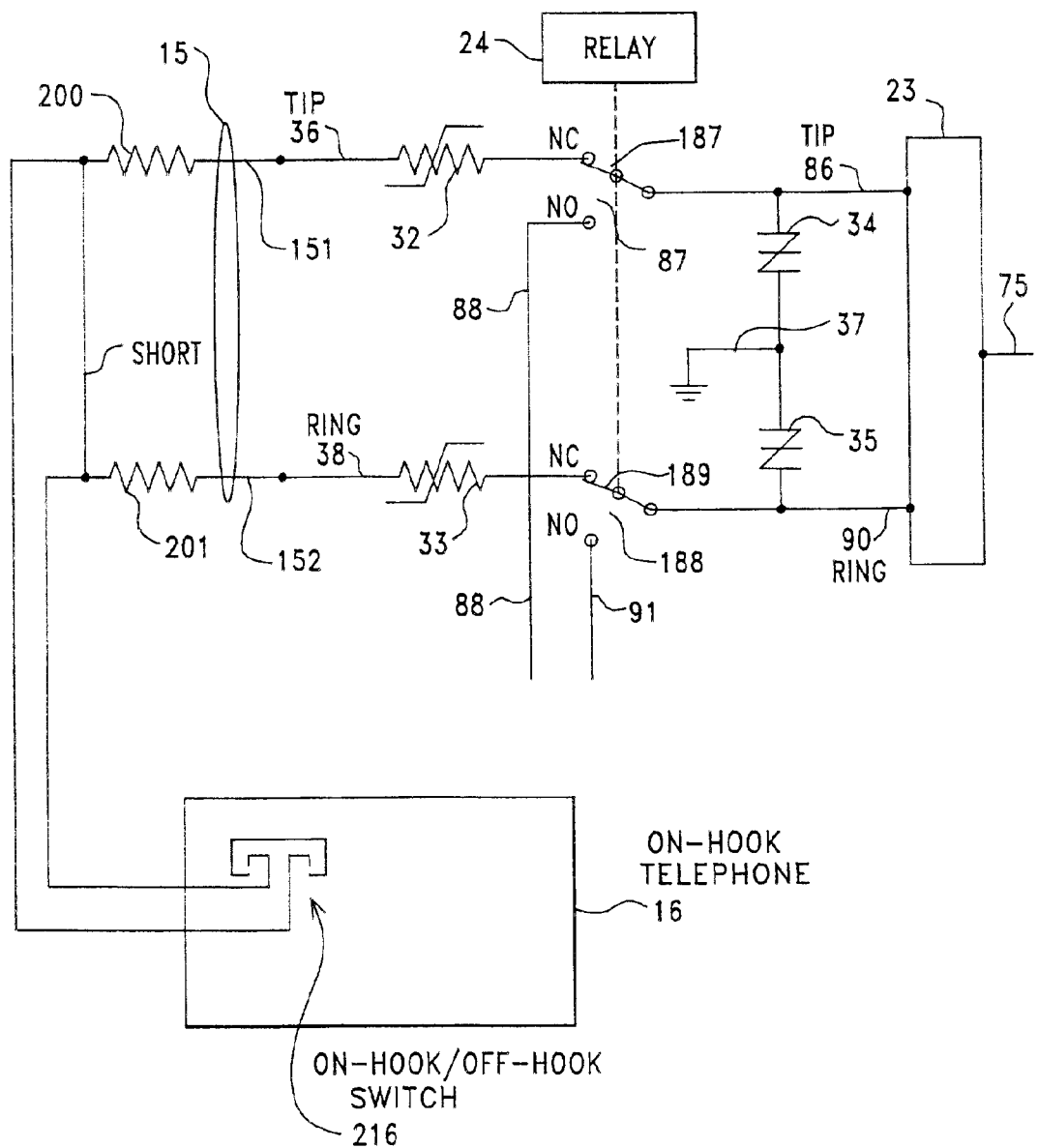

The FIG. 11 is a figure similar to FIG. 2 that is useful in describing assistant-required loop-tests that are applied to one or more of the eight FIG. 1 interface circuits is selected using the FIG. 5 GUI.

DESCRIPTION OF THE PREFERRED EMBODIMENTS

FIG. 1 shows a telecommunications system 10 that includes the present invention. Telecommunications system 10 includes a telephone exchange 11 that supplies voice and data services to a home or small business 12 whereat a CST 13 is installed.

CST 13 is bi-directionally connected to telephone exchange 11 by way of a digital subscriber line (DSL), and more specifically by way of a symmetric digital subscriber line (SDSL).

The output of CST 13 comprises a plurality of external telephone lines 15 that bi-directionally connect CST 13 to a plurality of telephone handsets 16 and/or data terminals such as PCs 17. Eight external telephone lines 15 are shown connected to CST 13, and for purposes of convenience only one telephone line 15 is shown connected to one handset 16 and to one PC 17.

Each external telephone line 15 comprises a ring lead and a tip lead (i.e., a differential pair that bi-directionally carries voice signals), also called a ring/tip pair, and within CST 13 each external telephone line ring/tip pair 15 is connected to an ring/tip pair 18 that is internal to CST 13.

CST 13 includes a web server 19 that bi-directionally connects an Ethernet line 20 and its PC 21 to a data signal processor 22. The output of processor 22 comprises two coder/decoders (CODEC) 26, each CODEC 26 being connected to four interface circuits that are within an eight interface circuit array 23. Each interface circuit that is within interface circuit array 23 is connected to an individual one of the eight internal ring/tip pairs 18 by way of a relay array 24.

In an embodiment of the invention, asynchronous transfer mode (ATM) packetized voice and/or packetized data simple network management protocol (SNMP) signals are received from and supplied to processor 22 by way of SDSL 14. More specifically, SNMP is utilized relative to packetized data, whereas packetized voice arrives via a time-multiplexed channel that is proprietary to the specific telephone exchange equipment.

In accordance with the invention, and for the purposes of testing CST 13 and the external telephone lines 15 that are connected thereto, a PC 21 is provided generally at the location of home/small business 12, and a PC 25 can also be provided generally at the location of telephone exchange 11.

In an embodiment of the invention, PC 21 bi-directionally communicated with the web server 19 that is within CST 13 by way of hypertext markup language (HTML) commands, queries, etc., that ran over hypertext transfer protocol (HTTP) on Ethernet line 20, and PC 25 bi-directionally communicated with web server 19 by way of SNMP commands, queries, etc., on SDSL 14.

In an embodiment of the invention, each of the two CODEC 26 comprises a model MT 85361TL quad coder/decoder (codec) by Agere Systems, and each of the eight interface circuits 24 comprises a model L934GP-DT subscriber line interface circuit (SLIC) by Agere Systems.

FIG. 2 shows a one-telephone line portion 30 of CST 13 that is connected to an external telephone line ring/tip pair 15 that extends into the home or small business 12.

CST 13 provides one such FIG. 2 portion 30 for each of the eight external telephone lines 15 that are connected to the CST eight internal telephone lines 18. CST portion 13 provides both over voltage and over-current surge protection to CST 13 relative to voltage and current conditions that occur within an attached telephone line ring/tip pair 15.

As shown at 31, primary lightning protection is conventionally provided to the external telephone line's ring/tip pair 15.

Two polyswitches 32 and 33 provide over current protection to CST 13. Polyswitches 32 and 33 are positive temperature coefficient (PCT) devices that open circuit as they heat up. The greater the current that passes through polyswitches 32, 33, the faster the polyswitches will open circuit. Polyswitches 32 and 33 isolate CST 13 from power cross situations within the attached telephone line ring/tip twisted pairs 15 that are external to CST 13.

Two sidactors 34 and 35 provide over-voltage protection to CST 13. Sidactors 34 and 35 are bi-directional solid-state PNPN devices. When the break down voltage of PNPN devices 34, 35 is exceeded, devices 34, 35 crowbar back to a low voltage, as they carry a large transient current that can be as high as about 500 amps for a time period of about 12 micro seconds, this time period being sufficient for polyswitches 32 and 33 to open circuit and thereby provide over-current protection.

Note that sidactors 34 and 35 examples are a Teccor Electronics brand of solid-state crowbar device that is designed to protect telecommunications equipment during hazardous transient electrical conditions wherein the sidactor device normally exhibits a high off-state impedance, thus eliminating excessive leakage currents and appearing transparent to the circuits that it protects. Upon the application of a voltage that exceeds the sidactor switching voltage, the sidactor crowbars and simulates a short circuit condition, thereafter resetting to the high off-state impedance condition.

The FIG. 2 totem pole arrangement of sidactors 34 and 35 provides tip lead 36 to ground 37 protection, ring lead 38 to ground 37 protection, and tip lead 36 to ring lead 38 protection.

A relay 39 that is within FIG. 1 relay array 24 operates to change the connection of the CST internal tip lead 36 and internal ring lead 38 during testing, as will be described. If desired, relay array 24 can be located on the opposite side of polyswitches 32, 33 from that shown in FIG. 2.

This invention finds utility when used in the FIG. 1 telecommunication system 10 that includes CST 13 that supplies analog voice service and digital data service to telephone handsets 16 and/or data terminals 17 that are within home or small business 12.

An output 18 of CST 13 is connected to eight individual analog or voice telephone lines 15, and an input of CST 13 is connected to telephone exchange 11 by way of SDSL (or DSL) 14, with clocking for CST 13 being derived from SDSL 14.

Each of the eight telephone lines 15 within home or small business 12 comprises a twisted pair; i.e., a ring lead and a tip lead. Each ring/tip pair comprises as a single telephone line 15, and each ring/tip pair comprises a differential pair that carries bi-directional analog voice signals and/or bi-directional digital data signals to and from one of eight interface circuits 23 that are within CST 13.

In this embodiment of the invention, CST 13 included an Ethernet connection 20 by way of a 10Base-T Ethernet local area network (LAN) interface that included either an RJ-45 connector or an insulation displacement connector.

In telecommunications system 10, the present invention provides for the self-testing of CST 13, as well as the loop testing of external telephone lines 15 that are connected to CST 13.

Testing includes the testing of CST-external telephone lines 15, the testing of portions of CST 13 that are internal to CST 13, including CST-internal ring and tip lines 18 that are associated with specific ones of the CST-external telephone ring and tip lines 15, and the testing of portions of CST 13 that are internal to CST 13 and are not associated with any specific CST-external telephone line 15. Multiple CST portions and/or telephone lines can be selected for testing, and multiple tests can be selected. However, when multiple tests are selected, the selected tests are run serially, or one after the other.

Desirably, tests in accordance with the invention are completed within a short time duration (for example, less that one second) thus minimizing the chance that a telephone user at CST 13 will activate a telephone 16 and thereby cause the telephone to go off hook during a test, which off-hook event may have an adverse effect on the outcome of the test due to the low resistance that is presented by an off-hook telephone, and due to the variable length of the transmission line that extends to the off-hook telephone.

In an embodiment of the invention, testing of CST 13 was grouped into two groups; namely, the loop testing of external telephone lines 15 and the self-testing of components, including tip leads and ring leads 18, that are within CST 13. In this embodiment of the invention, software responsible for executing the loop-tests and the self-tests ran on FIG. 1 signal processor 22 such that the self tests inherently verified that signal processor 22 was operating properly.

With reference to FIG. 1, during a loop test, the CST-external ring/tip pair 15 that is undergoing test is isolated from normal operation, and during self test, the CST-internal ring/tip pair 18 that is undergoing test is isolated from its corresponding CST-external ring/tip pair 15.

Loop-tests facilitate testing the CST-external telephone lines 15 for faults (loop faults). Loop faults include two types, i.e. short circuits that can be directly detected, and open circuits whose detection requires human assistance.

Loop short circuit faults include the shorting of any CST-external tip lead or a CST-external ring lead to a ground, the shorting of a CST-external tip lead or CST-external ring lead to a voltage, or the shorting of a CST-external tip lead to a CST-external ring lead.

Loop open circuit faults includes a break in any CST-external tip lead or CST-external ring lead that does not include connection to a voltage potential.

Self-tests facilitate the testing of tip leads 36 and ring leads 38 that are internal to CST 13. The self tests (i.e. the CST tests) include DC functional testing of loop closure between a CST ring lead 38 and a CST tip lead 36, DC functional testing of a CST ring lead 38 to ground 32, DC functional testing of a CST ring lead 38 to an associated CST tip lead 36, AC functional testing of the CST transmit gain and receive gain, AC functional testing of the CST trans-hybrid loss, and AC functional testing of the CST ringing signal.

In an embodiment of the invention, the loop-tests (i.e., the CST-external tests) included:

(1) External tips lead to a voltage or to a ground Short—wherein a test circuit measures the current that flows from a ground potential, or from a reference voltage source, to the actual voltage that is on an external telephone line tip lead, as well as measuring the actual voltage magnitude that is present on the telephone line tip lead.

This current measurement detects a grounding of the telephone line tip lead, and detects fault voltages that may be present on the telephone line tip lead.

This voltage measurement detects any fault voltage that is on the telephone line tip lead and is of too low a magnitude to produce a measurable current for detection by the test current measurement.

If this test finds that there is no measurable current flow in the telephone line tip lead, and if the test finds that the voltage present on the telephone line tip lead is within a range for correct operation, the test is passed.

(2) External ring lead to a voltage or to a ground Short—wherein a test circuit operates as above-described, but with reference to the external telephone line ring lead.

(3) External tip lead to external ring lead short—wherein a test circuit detects an off-hook condition of a telephone handset(s) that is connected to an external telephone line after an assistant has checked to ensure that all handsets that are attached to the external telephone line are in fact on hook.

When such a false off-hook condition is detected, it is known that a telephone line tip lead is shorted to the telephone line ring lead.

(4) Loop Open—wherein an assistant places a voltage source across an external telephone line tip lead and ring lead, while the assistant ensures that all telephone handsets that are connected to the telephone line are in fact off hook, and wherein the telephone line current flow is then measured.

If no current flow is detected, it is known that a loop open fault (open circuit) exists in the telephone line.

In an embodiment of the invention, the self tests (i.e., the CST-internal tests) included:

(1) Loop Closure/Loop Open—wherein a termination resistor is connected across one of the CST-internal tip lead and ring lead pairs to provide loop start verification.

In this and other tests wherein a termination resistor is used, the value of the termination resistor reproduces the effects of a telephone handset or of another piece of telecommunications equipment such as a key system or a private branch exchange (PBX) that is connected to the CST tip lead and ring lead pair.

If electrical continuity is detected between this CST tip and ring lead pair, the test is passed.

(2) Ring Ground—wherein a termination resistor is connected between one of the CST internal ring leads and ground potential to provide ground start verification.

If electrical continuity is detected from CST ring lead to ground, the test is passed.

(3) Ring Trip—wherein a termination resistor is connected between one of the CST internal tip leads and its corresponding internal ring lead for ring trip detection.

In this test, a ring signal that was applied to the CST ring/tip pair is interrupted, and loop start is initiated, all of which must be completed within a given time period.

If ring trip is detected within a time interval such as about 150 milliseconds, the CST tip/ring pair passes the test.

(4) Sidactor Short and On-Hook Voltage—wherein the on-hook voltage of a CST internal ring/tip pair is measured to verify that the on-hook voltage performance of the CST subscriber line interface circuit (SLIC) is correct, as well as to determine if any of the CST sidactor over-voltage protection devices are shorted.

If an on-hook voltage of a proper magnitude is detected, for example a voltage of between about 10 and 56 volts DC, and if a ring lead connection to ground is not detected, then the CST ring/tip pair passes the test.

(5) Current limit and Off Hook Current—wherein a CST internal ring/tip pair off-hook current is measured to verify that the CST SLIC is operating correctly, as well as to determine if the CST current limiting circuit is operating correctly.

If the ring/tip pair primary off-hook current is between about 19.5 to 25 milliamps, and if the ring/tip pair secondary off-hook current is about 10 to 13 milliamps, then the CST ring/tip pair passes the test.

The following two self tests are primarily intended to verify the correct internal operating of the FIG. 1 CODEC 26.

(6) Transmit and Receive Gain—wherein an open circuit is provided between a first end of the external telephone line tip and ring leads, and a test tone of a voice frequency is then applied between a second end of the telephone line's tip and ring leads.

The tone reflection from the first end back to the second end verifies transmit and receive path continuity, as well as verifying the transmit and receive gains.

A measured reflection of a given dB, for example 0.3 dB, of the transmitted tone level indicates an operating transmit and receive voice path.

(7) Trans-Hybrid Loss (THL) termination impedance—wherein a termination impedance is applied between a first end of the external telephone line tip and ring leads, and a tone of a voice frequency is then applied to a second end of the tip and ring leads.

The tone reflection from the first end back to the second end is a measurement of the THL. Non-limiting example passing values are about 30 dB when a 600-ohm terminating impedance is used, and about 19 dB when a 900-ohm terminating impedance is used.

As a feature of this invention, web page technology is utilized to facilitate the above-described loop testing of telephone lines that are external to CST 13 and the self-testing of internal portions of CST 13. As is well known, in this technology, computer screen selections are made by manually positioning a cursor on a screen field and then clicking a mouse button or manually pressing a keyboard key.

Figure 3:
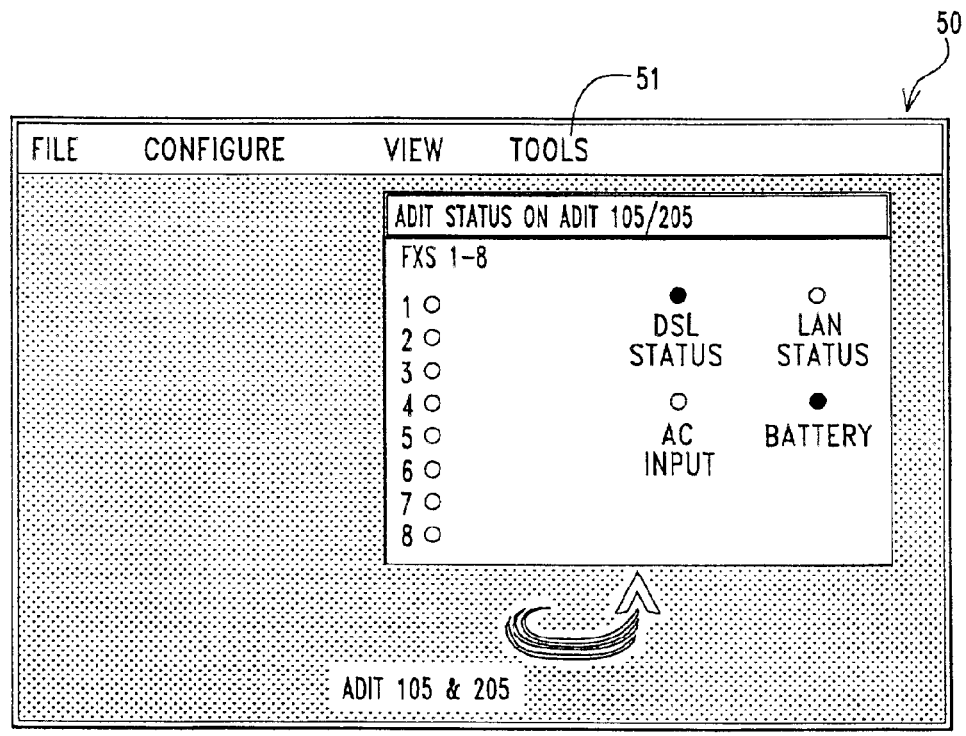
FIGS. 3, 4 and 5 show graphic user interface (GUI) screens that are provided at a PC shown in FIG. 1 whereby self-testing, loop testing and assisted loop testing in accordance with the invention is provided to a GUI-selected interface circuit and/or telephone line of FIG. 1, FIG. 3 showing a start screen that allows the selection of a Tools field, whereupon the FIG. 4 screen is then provided to allow the selection of a Test FX Lines field, followed by the FIG. 5 screen that provides for the selection of tests to be applied to selected FS lines, the FIG. 5 screen also including a field that reports the results of selected tests.

FIG. 3 shows a non-limiting example of a main GUI screen 50 that is presented to service personnel at a computer such as FIG. 1 PC 21, this screen having a cursor-selectable "tool" portion 51. When the screen's "tool" portion 51 is selected, the FIG. 4 drop-down menu 52 appears, this menu having a cursor-selectable "Test FX Lines" portion 53 (note FIG. 4).

Figure 4:
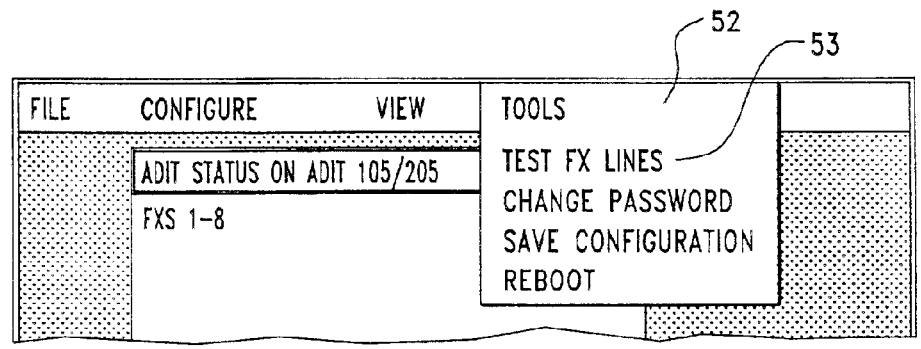

When FIG. 4 "Test FX Lines" screen portion 53 is selected, a screen is presented that facilitates execution of the above-described loop testing and self-testing.

FIG. 5 is a non-limiting example of such a GUI screen in accordance the invention wherein CST 13 includes eight internal channels that connect to eight CST-external telephone line tip/ring pairs 15 (identified in FIG. 5 as FXS 1–8), each external telephone line 15 being connected to one or more telephones 16 and/or PCs 17 that are within a home or a small business 12.

In FIG. 5, the screen vertical status column 55 identifies each of the eight CST-external telephone lines 15, these external telephone lines being identified as FXS 1–8. The screen vertical apply column 56 contains, as an example, a check mark to indicate that the test that was selected from the screen select test field 57 is to be applied to FXS 1. In the example of FIG. 5, the selected test of field 57 is shown to be "Loop Closure", and this test is to be applied to "FXS 1".

After a FXS line is selected, and after a test is selected, the screen Test Status field 58 displays the message "Ready" whereupon the test(s) can be applied to the designated FSX line(s) by cursor activation of the screen "apply to selected lines" field 59. Thereafter, and while the test(s) is running on one or more of the FXS lines, field 58 displays the message "Test running."

The screen field 60 is a Test Results field. In this example, field 60 carries the message "Line 1 Loop Closure: Test Passed." If desired, and for tests that measure parameters such as times, voltages, currents and/or power levels, field 60 can display the value of these measurements for use in manufacturing, engineering, and/or trouble shooting.

Select Test field 57 provides a drop-down menu when the screen cursor is placed on arrow 61 and then activated. In a non-limiting embodiment of the invention, this drop-down menu included the above-described loop-tests and self tests, as well as Group DC Test This test runs the above-described Loop Closure, Ring Tip, Ring Ground, Sidactor Short and On Hook Voltage Fault, and Current Limit Switch tests.

Group AC Test
This test runs the above-described Transmit Receive Gain and Trans-Hybrid Loss Termination Impedance tests.
Group Loop Shorts Test
This test runs the above-described Tip to Voltage and the above-described Ring to Voltage test.
Group AC DC Test
This test runs the above-described Group AC Test and the above-described Group DC Test.
Group Unassisted Test
This test runs the above-described Group AC DC Test and the above-described Group Loop Shorts Test.

Some of the above-mentioned loop-tests of telephone lines 15 that are external to CST 13, and some of the above-mentioned self tests of components that are within CST 13, require measuring the magnitude of a voltage or the magnitude of a current that is supplied by one of FIG. 1 interface circuits 23 during the loop test or during the self test.

Figure 6:
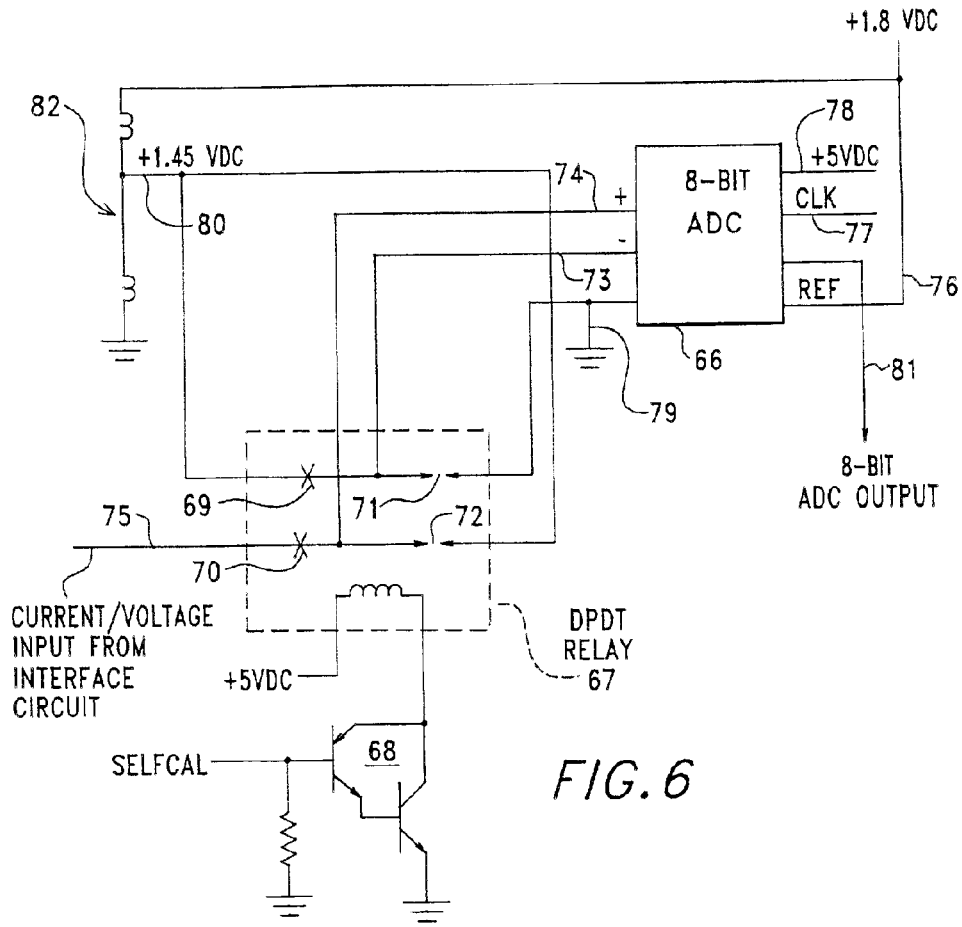
FIG. 6 shows an 8-bit analog to digital converter (ADC) wherein the ADC is calibrated prior to making measurements in accordance with the invention.

FIG. 6 shows an 8-bit analog to digital converter (ADC) 66 that is calibrated prior to making measurements by way of analog to digital conversion. This calibration of ADC 66 operates to compensate for tolerances in the plus 1.8 volts direct current (VDC) reference voltage 76 and the voltage divider 82 by measuring a divider voltage 80 during calibration, and then storing this calibration measurement for use relative to the later measurement of an ADC input 75. Thus, the measurement of input 75 by ADC 66 ignores tolerances in reference voltage 76 and voltage divider 82. This calibration of ADC 66 enables the use of a relatively small 8-bit ADC to accurately calculate the magnitude of input voltages 75 in a manner that is usually associated only with ADCs having a greater bit capacity.

In an embodiment of the invention, ADC 66 was a model ADC 08831IM by National Semiconductor Corporation.

When ADC 66 is used to measure a current input 75, the above-mentioned calibration of ADC 66 is not required since errors are cancelled out by differential current measurement.

Calibration of ADC 66 is achieved by the energization of a double pole, double throw, relay 67 by transistor network 68.

As can be seen in FIG. 6, in the de-energized state of relay 67, switches 69 and 70 are closed (normally closed or NC) and switches 71 and 72 are open (normally open or NO).

ADC 66 is provided with a reference potential 76, in this case plus 1.8 volts VDC, with a clock input 77, with a source of operating voltage 78 such as plus 5 VDC, and with ground potential 79.

In the measuring mode of operation of ADC 66 relay 67 is de-energized, and the plus input 74 of ADC 66 is connected through NC switch 70 to the ADC analog input current/voltage 75 that is to be measured, which analog current/voltage is supplied by the test-related one of FIG. 1 interface circuits 23 during a loop test or during a self test. In addition, the negative input 73 of ADC 66 (i.e., reference input 73 for ADC 66) is connected through NC switch 69 to a calibration reference source 80 of about plus 1.45 VDC.

In the FIG. 6 construction and arrangement, voltage divider 82 defines the minimum point of the ADC voltage span, while reference voltage 76 defines the ADC's actual voltage span. In an embodiment of the invention, input analog voltage 75 was referenced to about a nominal 2.3 volts, and since a span of about plus 0.9 volts and minus 0.9 volts was desired around this nominal 2.3 volts (i.e., an ADC voltage span of from about 3.2 volts to about 1.4 volts), voltage divider reference voltage 80 was designed to provide the minimum point of about 1.4 volts for the ADC voltage span.

Note that the plus 1.45 VDC calibration reference source 80 is provided by way of resistor voltage division at 82 of the plus 1.8 VDC reference input 76.

The 8-bit serial output of ADC 66 appears on clocked output conductor or bus 81. The measuring range of ADC 66 is defined by the magnitude of reference voltage 76, in this case, plus 1.8 VDC. This construction and arrangement sets the nominal volts/bit output 81 of ADC 66 at about 0.007 VDC for each decimal equivalent value of the bit value of output 81.

In an embodiment of the invention, the nominal "0" voltage output 75 of a FIG. 1 interface circuit 23 was about 2.35 VDC.

In order to center the ADC 1.8 DVC measuring range at about this nominal "0" voltage output 75 of an interface circuit 23, the negative input 73 of ADC 66 was raised from ground to about plus 1.45 VDC by resistor voltage divider 82.

In the calibration mode of operation of ADC 66, relay 67 is energized. In this calibration mode of FIG. 6, the negative input 73 of ADC 66 (i.e., reference input 73) is connected through NO switch 71 to ground 79, the plus input 74 of ADC 66 is simultaneously connected through NO switch 72 to plus 1.45 VDC at 80, and an 8-bit calibration output then appears at 81.

This calibration 8-bit output 81 of ADC 66 is then stored for comparison to the above-mentioned 8-bit output 81 of ADC 66 when the ADC plus input 74 is connected to interface circuit output 75 and when the ADC negative input 73 is connected to plus 1.45 VDC at 80. Stated another way, the calibration output is stored and used as a DC constant for measurement calculation.

In an embodiment of the invention, the ADC arrangement of FIG. 6 was calibrated before each test that required the measurement of a voltage at input 75.

Figure 7:
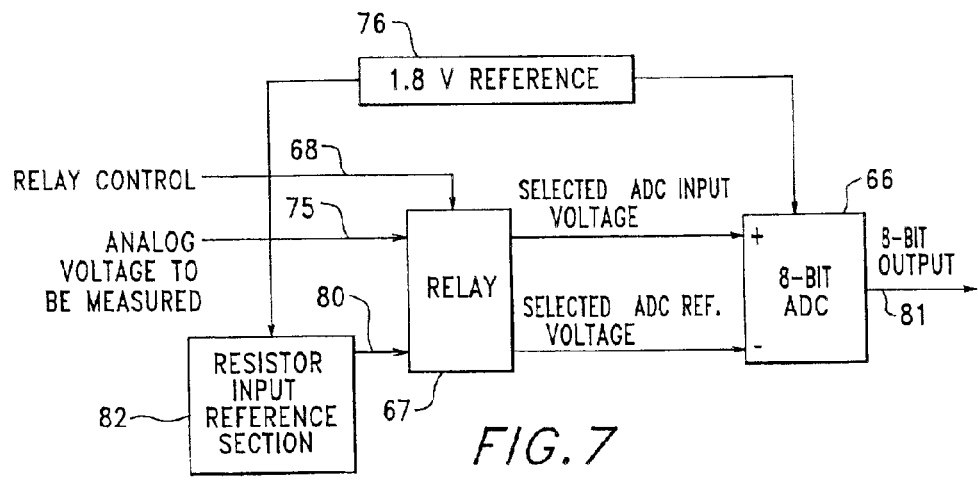
FIG. 7 is another showing of the FIG. 6 ADC.

FIG. 7 is another showing of the FIG. 6 ADC construction and arrangement wherein the analog voltage 75 that is to be measured is normally connected to the "+" input of ADC 66, as the ADC's "−" input is connected to output 80 of voltage divider 82. However, when relay 67 is activated, this "+" input is connected to voltage divider 82 as the "−" input is connected to ground potential.

Figure 8:
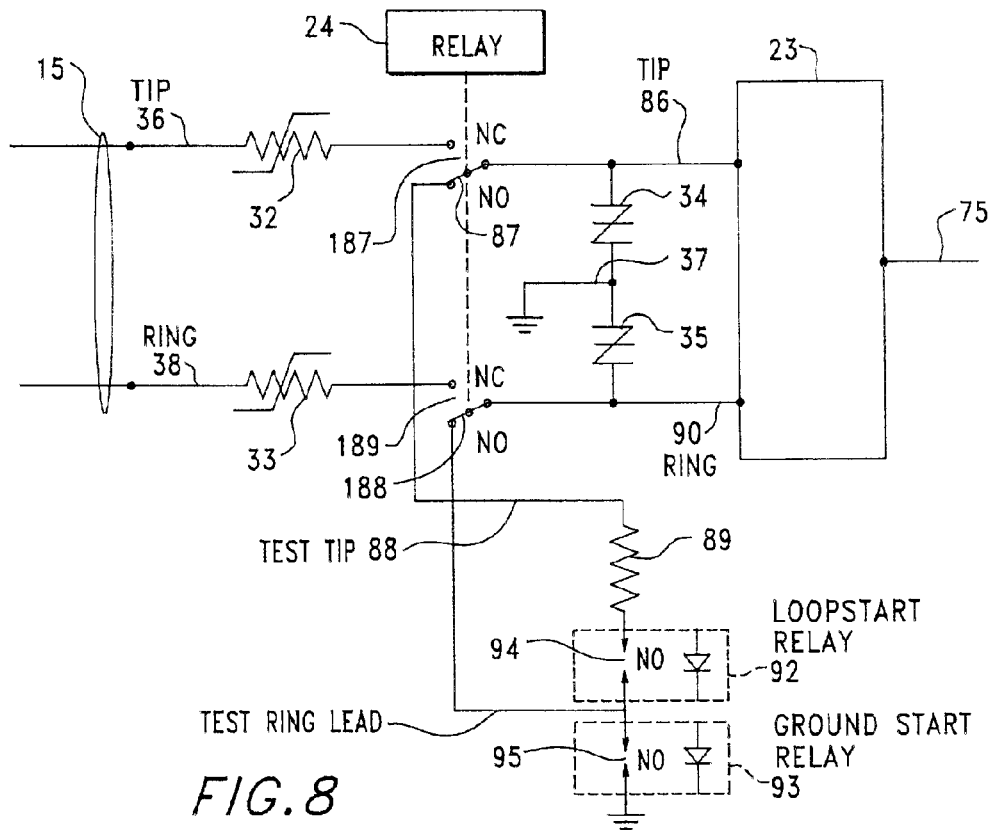
FIG. 8 is similar to FIG. 2.

FIG. 8 is a figure similar to FIG. 2 that shows a circuit configuration that is used to provide the above-mentioned self tests to one of the eight FIG. 1 interface circuits 23 that is selected using the FIG. 5 GUI, and wherein relay 24 that is associated with the selected interface circuit 23 is shown in its energized or self-test state. Relay 24 includes two normally closed (NC) switches 187 and 189 that are closed as long as relay 24 is in its de-energized state, and two normally open (NO) switches 87 and 188 that are closed as long as relay 24 is in its energized state as shown.

Loop Closed/Loop Open Self Test:
With reference to FIG. 8, the loop closed/loop open self-test operates to detect the loop closure portion of interface circuit 23. If interface circuit 23 properly detects an impedance 89 being connected across test tip lead 88 and test ring lead 91, and if interface circuit 23 does not falsely detect loop closure when one does not exist, then interface circuit 23 and its associated components are operating properly.

When relay 24 energized, the interface circuit tip lead 86 is connected through NO switch 87 to a test tip lead 88 that connects to an impedance 89 that simulates the impedance of CST-external telephone line 15. In addition, the interface circuit ring lead 90 is connected to a test ring lead 91.

Two solid-state relays 92 and 93 are provided, only relay 92 of which is used in this self-test. Relay 92 is a loop start relay whose energization simulates a loop start condition. Relay 92 includes a NO switch 94. Relay 93 is a ground start relay whose energization simulates a ground start condition. Relay 93 includes a NO switch 95.

The first step of this self-test is to energize relay 24 to produce the circuit configuration shown in FIG. 8.

The second step of this test grounds test tip lead 86 and connects test ring lead 90 to a voltage of about minus 48 VDC. In this state of the FIG. 8 circuit, interface circuit 23 should not detect loop closure; i.e., should not detect current flow.

The state of interface circuit 23 is detected via a current detection unit (not shown) that is internal to each of the eight interface circuits 23. As long as no current flows, the current detection unit will not indicate current flow. When current flow is detected by the current flow unit, this condition is provided as an output to the associated CODEC 26 as a TTL-level signal, which CODEC is polled during the test by data signal processor 22 that is running the test.

The third step of this test provides that loop start relay 92 is energized, thus connecting test tip lead 88 to test ring lead 91 by way of impedance 89, to thereby simulate loop closure. The state of interface circuit 23 is now detected to verify that this simulated loop closure has been detected. Preferably, this detection step occurs no sooner than about 1.5 milliseconds (ms) after loop start relay 92 was energized.

In the fourth step of this test, loop start relay 92 is de-energized to simulate an open loop; i.e., to simulate a telephone on-hook condition of CST-external telephone line 15. In addition, ring lead 90 is grounded and tip lead 88 has a voltage of about minus 48 VDC applied thereto. The state of interface circuit 23 is detected to verify that loop closure is not detected The fifth step of this test provides that loop start relay 92 is again energized, thus connecting test tip lead 88 to test ring lead 91 by way of impedance 89, whereupon the state of interface circuit 23 is detected to verify that loop closure is detected. Again, this detection should take place no sooner than about 1.5 ms after the energization of loop start relay 92.

As the sixth step of this test, and with loop start relay 92 remaining energized, tip lead 86 is again grounded and ring lead 90 has a voltage of about minus 48 VDC again applied thereto. This simulates a battery switch that is used for line side supervision. It is then verified that interface circuit 23 correctly reads loop closure, and that any loop open detection did not last for longer than about 1 ms This completes this self-test whereupon loop start relay 92 and relay 24 are de-energized, to thereby return the FIG. 8 circuit to the condition shown in FIG. 2, whereupon the test results are reported to the FIG. 5 GUI.

Ring Trip Self Test:
With reference to FIG. 8, the ring trip self test verifies that a selected interface circuit 23 is operating correctly by testing the ring trip detection portion of the interface circuit.

If interface circuit 23 operates correctly when termination resistor 89 is connected across its CST-internal tip lead 86 and CST-internal ring lead 90, and if interface circuit 23 does not falsely detect a ring trip when one does not actually exist, then interface circuit 23 and associated components are operating properly.

By energizing FIG. 8 loop start relay 92 (i.e., by closing NO switch 94), a closed loop is simulated.

The first step of this self-test is to energize relay 24 to produce the circuit configuration shown in FIG. 8.

As the second step of this self test, interface circuit 23 is controlled to apply a ringing voltage between tip lead 86 and ring lead 90 (i.e., tip lead 86 is grounded and about 55 VAC is applied to ring lead 90) in order to determine that a ring trip is not detected with NO switch 94 in its open position (i.e., loop closure is not detected).

The third step of this self-test causes loop start relay 92 to be energized (i.e., NO switch 94 is closed) and a timer (not shown) begins timing a time interval. A ring trip (i.e., current flow through the closed loop) should now be detected within about 150 ms as measured by this timer. In addition, tip lead 86 can thereafter be grounded, and about minus 48 VDC can be applied to ring lead 90 to verify that loop closure is detected in this manner. This operation simulates removal of the ringing voltage after a ring trip has been detected.

As a final step of this self test, loop start relay 92 is de-energized, and relay 24 is de-energized to reconnect CST-external telephone line 15 to interface circuit 23 as shown in FIG. 2, whereupon the test results are transmitted to the results field 60 of the FIG. 5 GUI.

Ring Ground Self Test:
With reference to FIG. 8, the ring ground self-test verifies that interface circuit 23 is operating properly by testing the ring ground detection portion of interface circuit 23.

If interface circuit 23 properly detects that this self test has connected test ring lead 91 to ground 96, and if interface circuit 23 does not falsely detect a ring ground when one does not exist, then interface circuit 23 and associated components are operating properly.

The first step of this test is to energized relay 24 to thereby produce the circuit configuration shown in FIG. 8.

As the second step of this test, interface circuit 23 is controlled to ground tip lead 86 and to apply about minus 48 VDC to ring lead 90, followed by open circuiting tip lead 86. With tip lead 86 open, the test then verifies that interface circuit 23 is not detecting ground potential at ring lead 90.

As the third step of this test, ground start relay 93 is energized to simulate a ground start; i.e., switch 95 is closed. With tip lead open and with relay 93 energized, it is now verified that interface circuit 23 correctly detects the grounding of ring lead 90.

As the final step of this test, ground start relay 93 is de-energized, and relay 24 is de-energized to reconnect CST-external telephone line 15 to interface circuit 23 as shown in FIG. 2, whereupon the results of this self test are reported to the FIG. 5 GUI.

On-Hook Voltage and Over-Voltage Protector Self Test:
With reference to FIGS. 6 and 8, the on-hook voltage and over-voltage protector self-test operates to verify that the GUI-selected interface circuit 23 is operating correctly by measuring the tip-to-ring output voltage 75 from the interface circuit.

If this tip-to-ring voltage is between about minus 40 VDC and minus 56 VDC, and if the interface circuit does not falsely detect a loop current when none is applied, then the interface circuit and its over-voltage protection devices 34 and 35 are working properly. That is, the test verifies that no damaged sidactor 34 or 35 is causing a short to ground 37, and the test verifies that the on-hook voltage output 75 of interface circuit 23 is above a minimum value.

As a first step of this self-test, relay 24 is activated to provide the FIG. 8 configuration.

The next step of this test is to activate FIG. 6 relay 67 and then measure and store the 8-bit calibration output 81 of ADC 66 ($V_{cal}$), whereupon relay 67 is deactivated to restore the ADC configuration that is shown in FIG. 6.

As the next step of this test, FIG. 8 tip lead 86 is connected to minus 48 VDC and FIG. 8 ring lead 90 is connected to ground.

With this connection of the tip lead and ring lead and as the next step of this test, the FIG. 8 tip lead 86 and ring lead 90 are open circuited. That is, neither tip lead 86 or ring lead 90 is connected to a voltage source. In this state, the 8-bit reference output 81 of ADC 66 ($V_1$) is measured and stored. Thereafter, tip lead 86 is reconnected to ring lead 90.

As the next step of this test, and with tip lead 86 connected to minus 48 VDC and with ring lead 90 connected to ground, the 8-bit tip voltage output 81 of ADC 66 ($V_2$) is measured and stored.

Tip-to-ground voltage is then calculated using the following formula.

$$V_{tip\text{-}to\text{-}ground} = (V_1 + V_{cal}) - 75(1 - 0075|V_2 - V_1|)(V_2 - V_1)$$

As the next step of this test, the FIG. 8 tip lead 86 is grounded, the ring lead is connected to minus 48 VDC, and it is verified that interface circuit 23 is not incorrectly reading a ground on ring lead 90.

As the next step of this test, the FIG. 8 loop start relay 92 is energized to thereby close switch 94 and to thereby simulate a loop closure (i.e., a phone off-hook condition). It is now verified that interface circuit 23 is correctly reading a loop closure current, whereupon relay 92 is de-energized to establish a loop open condition (i.e., a phone on-hook condition).

As a final step of this test, FIG. 8 relay 24 is de-energized and the test results are reported to the FIG. 5 GUI.

Off-Hook Current and Current Switch Self Test:

The off-hook current and current switch self test verifies that the selected interface circuit 23 is operating properly by measuring the tip lead to ring lead current. This test also verifies that a current selection portion of the interface circuit that is responsible for switching from an initial or normal current to a lower current is operation correctly.

If the initial or normal current is between about 20 and 25 milliamps (mA) and if the lower current is between about 10 and 14 mA, then the current selection portion of the interface circuit is operating properly. Stated another way, the off-hook current and current switch self test checks the interface circuit programmed normal current limit threshold and a lower switched current limit that is used during tip lead to ring lead short testing.

As a first step of this self-test, FIG. 8 relay 24 is energized to provide the circuit configuration shown therein.

As the next step in the test, tip lead 86 is grounded, ring lead 90 is connected to about minus 48 VDC, and loop start relay 92 is energized to close switch 94, whereupon tip lead 86 and ring lead 90 are open circuited. That is, neither tip lead 86 or ring lead 90 is now connected to a voltage source. In this state, the tip lead to ring lead current is measured by the FIG. 5 ADC, and its 8-bit output 81 is stored as a value $V_1$. This measured current should be zero, or very nearly zero.

As the next step of this test, the open circuiting of tip lead 86 and ring lead 90 is removed, whereupon test tip lead 86 is again grounded and ring lead 90 is again connected to about minus 48 VDC. In this state, the tip lead to ring lead current is measured by the FIG. 5 ADC and its 8-bit output 81 stored as a value $V_2$.

A first tip lead to ring lead real current, which should be in the range of about 20 to 25 mA is then calculated using the following formula.

$$\text{First tip-to-ring current} = (V_2 - V_1)/20$$

As the next step of this test, the selected interface circuit 23 is switched from the normal current of about 20 to 25 mA to the lower current of about 10 to 14 mA, with test tip lead 86 grounded and ring lead 90 connected to about minus 48 VDC, and tip lead 86 and ring lead 90 are open circuited. That is, neither tip lead 86 or ring lead 90 is now connected to a voltage source. In this state, the tip lead to ring lead current is measured by the FIG. 5 ADC, and its 8-bit output 81 is stored as a value $V_3$. This measured current should be zero, or very nearly zero.

As the next step of this test, tip lead 86 is grounded, ring lead 90 is connected to minus 48 VDC, and the tip lead to ring lead current is measured by the FIG. 5 ADC, and its 8-bit output 81 is stored as value $V_4$.

A second tip lead to ring lead real current, which should be in the range of about 10 to 14 mA, is then calculated using the following formula.

$$\text{Second tip-to-ring current} = (V_4 - V_3)/20$$

As a final step of this test, the interface circuit 23 under test is switched back to normal current, loop start relay 92 is de-energized to provide an open loop or on-hook condition, relay 24 is de-energized, and the test results are reported to the FIG. 5 GUI.

Transmit/Receive Gain Self Test:

The transmit/receive gain self test verifies that the selected interface circuit 23 and the FIG. 1 CODEC 26 that it is connected thereto are both operating correctly by generating a given tone at DSP 22, for example about 1004 Hz, and measuring a reflected tone to thereby determine the transmit and receive gains of the CODEC and interface circuit combination. If the reflected tone is within about 0.5 dB of the given tone, then the interface circuit, its CODEC, and associated components are operating properly.

As a first step of this test, FIG. 8 tip lead 86 is grounded, ring lead 90 is connected to about minus 48 VDC, relay 24 is energized to provide the FIG. 8 configuration, and in this state, it is verified that interface circuit 23 is not incorrectly sensing a loop closure. That is, it is verified that the interface circuit is correctly sensing the presence of impedance 89.

As the next step of this test, the gain of the FIG. 1 CODEC 26 to which the FIG. 8 interface circuit 23 is connected is set to provide a transmit gain of about zero dB and a receive gain of about zero dB.

The FIG. 1 DSP 22 is then controlled to provide a 1004 Hz tone output, for example at 0 dBm, which tone is applied to the CODEC 26 and interface circuit 23 under test. This tone is then reflected from this CODEC interface circuit combination back to DSP 22, whereat the gain or attenuation of the reflected tone is measured in dB's. This gain/attenuation should be very nearly 0 dB for the tone that was generated by DSP 26.

As the final step of this test, generation of the 1004 Hz tone is terminated, the transmit and receive gains of the related CODEC 24 are reset to their normal values, FIG. 8 relay 24 is de-energized, and the test results are transmitted to FIG. 5's GUI.

Transhybrid Loss and Termination Impedance Self Test:

The transhybrid loss (THL) and termination impedance self test verifies that the selected interface circuit 23 and the FIG. 1 CODEC 26 to which it is connected are both operating correctly by generating a tone at DSP 22 and then measuring the resulting transhybrid loss and termination impedance. If the measured tone is lower than a given value, then the interface circuit, its CODEC, and associated components are operating properly. That is, this test verifies that the value of the FIG. 8 termination impedance 89 and the measured THL match an impedance value and a THL that are programmed into the associated CODEC 26.

As a first step of this test, FIG. 8 tip lead 86 is grounded, ring lead 90 is connected to about minus 48 VDC, relay 24 is energized to provide the FIG. 8 configuration, and in this state, it is verified that interface circuit 23 is not incorrectly sensing a loop closure. That is, it is verified that the interface circuit is correctly sensing the presence of impedance 89.

As the next step of this test, the gain of the FIG. 1 CODEC 26 to which the FIG. 8 interface circuit 23 is connected is set to provide a transmit gain of about zero dB and a receive gain of about zero dB, and loop start relay 92 is energized to thereby close switch 94. In this state, it is verified that the selected interface circuit 23 is sensing a loop closure through impedance 89.

The FIG. 1 DSP 22 is then controlled to provide a 1004 Hz tone output, for example at 0 dBm, which tone is applied to the CODEC 26 and interface circuit 23 under test. This tone is then reflected from this CODEC interface circuit combination back to DSP 22, whereat the gain or attenuation of the reflected tone is measured in dB's. For example, when impedance 89 is about 600 ohms, then the THL should be greater than about 30 dB, and when impedance 89 is about 900 ohms, the THL should be about 15 dB.

As the final step of this test, generation of the 1004 Hz tone is terminated, the transmit and receive gains of the related CODEC 24 are reset to their normal values, FIG. 8 relay 24 and 92 are de-energized, and the test results are transmitted to FIG. 5 GUI.

Figure 9:
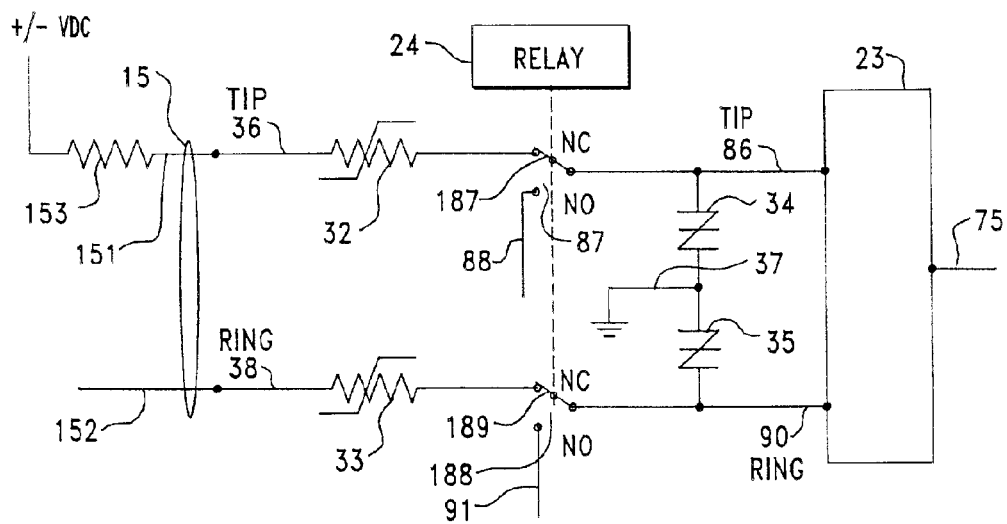
FIG. 9 is a figure similar to FIG. 2 that is useful in describing a tip-to-voltage or ground short loop test that is applied to one or more of the eight FIG. 1 interface circuits selected using the FIG. 5 GUI.

Tip-To-Voltage or Ground Short Loop Test:
FIG. 9 is a figure similar to FIGS. 2 and 8 that shows a circuit configuration that is used to apply the above-mentioned tip-to-voltage or ground short loop test to or more one of the eight FIG. 1 interface circuits 23 that is selected using the FIG. 5 GUI, and wherein relay 24 that is associated with the selected interface circuit 23 is in its de-energized or loop test state. In FIG. 9, the +/− VDC represents an external or foreign voltage and resistor 153 illustrates the resistance of external tip lead 151.

This tip-to-voltage or ground short loop test checks that the tip lead 151 within twisted pair telephone line 15 is not shorted to either a foreign voltage or to ground potential. If no current flow is detected in tip lead 151 when voltage is applied to an open circuit tip lead 151, and when no voltage is measured on tip lead 151 when ground potential is applied thereto, then there is no short and no foreign voltage on tip lead 151.

As a first step of this tip-to-voltage or ground short loop test, tip lead 86 is connected to ground potential and ring lead 90 is connected to about minus 48 VDC.

As the next step of this test, tip lead 86 and ring lead 90 is open circuited. That is neither test tip lead 86 or ring lead 90 is then connected to a voltage source. In this state, the current flowing in tip lead 86 is measured by the FIG. 6 ADC, and this 8-bit output 81 is stored as the voltage value $V_1$. This open-circuit tip lead current value should be zero, or very nearly zero.

As the next step of this test, tip lead 86 is reconnected to ground potential, as ring lead 90 remains open circuit. In this state, the current flowing in tip lead 151 is measured by the FIG. 6 ADC, and this 8-bit value 81 is stored as the voltage value $V_2$.

Tip current is then measured using the following formula, $$\text{Tip current} = (V_2 - V_1)/10.$$

As the next step in this test, ring lead 90 is reconnected to about minus 48 VDC, whereupon tip lead 86 and ring lead 90 are then open circuited. That is neither test tip lead 86 or ring lead 90 is then connected to a voltage source.

As the next step of this test, relay 67 of FIG. 6 is energized, and the 8-bit output 81 of ADC 66 is stored as the value $V_{cal}$.

As the next step of this test, relay 67 is de-energized, and the 8-bit output 81 of ADC is stored as the value $V_3$, while tip lead 86 and ring lead 90 remain open circuited.

As the next step of this test, tip lead 86 is connected to ground, ring lead 90 is connected to about minus 48 VDC, and ring lead 90 is open circuited, whereupon the 8-bit output 81 of ADC 66 (i.e., the tip voltage) is stored as the value $V_4$.

As the next step of this test, the tip-to-ground voltage is then calculated using the following formula.

$$\text{Tip-to-ground voltage} = (V_3 - V_{cal}) - 75(1 - 0.0075|V_4 - V_3|)(V_4 - V_3).$$

As the final step of this test, FIG. 9 relay 24 is de-energized and the test results are reported to the FIG. 5 GUI.

Figure 10:
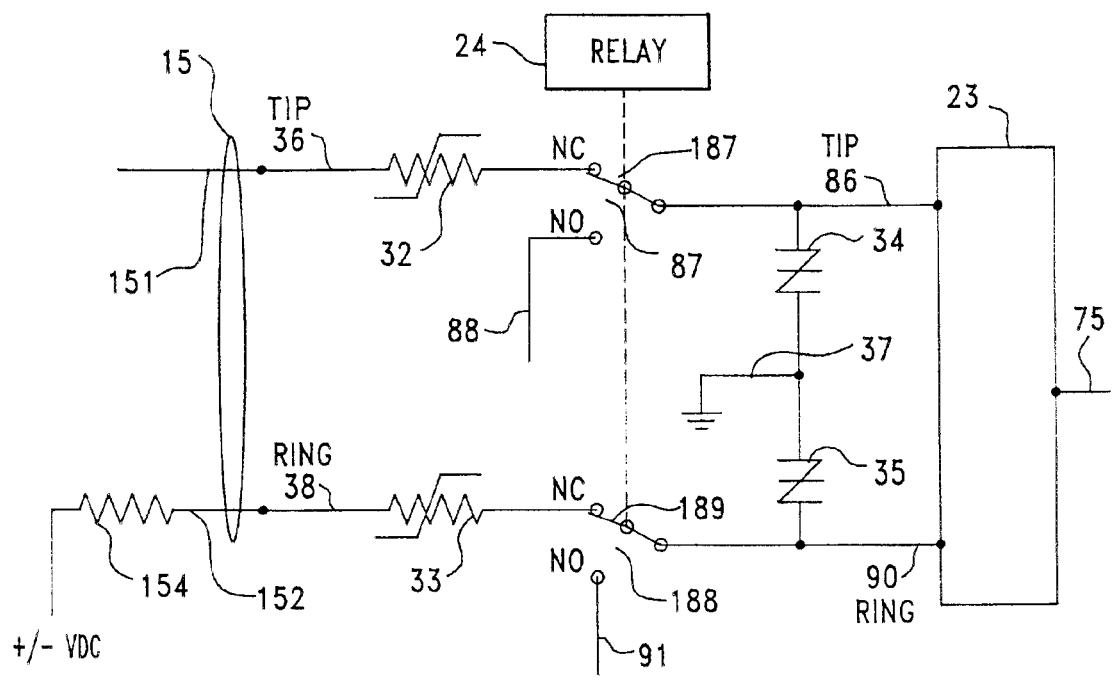
FIG. 10 is a figure similar to FIG. 2 that is useful in describing a ring-to-voltage or ground short loop test that is applied to one or more of the eight FIG. 1 interface circuits selected using the FIG. 5 GUI.

Ring-To-Voltage or Ground Short Loop Test:
FIG. 10 is a figure similar to FIGS. 2, 8 and 9 that shows a circuit configuration that is used to apply the above-mentioned ring-to-voltage or ground short loop test to one of the eight FIG. 1 interface circuits 23 that is selected using the FIG. 5 GUI, and wherein relay 24 that is associated with the selected interface circuit 23 is in its de-energized or loop test state. In FIG. 10, the +/− VDC represents an external or foreign voltage and resistor 154 illustrates the resistance of external tip lead 152.

This ring-to-voltage or ground short loop test checks that the ring lead 251 within twisted pair telephone line 15 is not shorted to either a foreign voltage or to ground potential. If no current flow is detected in ring lead 151 when voltage is applied to an open-circuit ring lead 151, and when no voltage is measured on ring lead 151 when ground potential is applied thereto, then there is no short and no foreign voltage on ring lead 151.

As a first step of this ring-to-voltage or ground short loop test, ring lead 90 is grounded and tip lead 86 is connected to about minus 48 VDC.

As the next step of this test, tip lead 86 and ring lead 90 is open circuited. That is, neither test tip lead 86 or ring lead 90 are then connected to a voltage source. In this state, the current flowing in ring lead 90 is measured by the FIG. 6 ADC, and the 8-bit output 81 thereof is stored as the voltage value $V_1$. This open-circuit ring lead current value should be zero, or very nearly zero.

As the next step of this test, ring lead 90 is reconnected to ground potential, as tip lead 86 remains open circuit. In this state, the current flowing in ring lead 151 is measured by the FIG. 6 ADC, and this 8-bit value 81 is stored as the voltage value $V_2$.

Ring current is then measured using the following formula, $$\text{Ring current} = (V_2 - V_1)/10.$$

As the next step in this test, tip lead 86 is reconnected to about minus 48 VDC, whereupon tip lead 86 and ring lead 90 are then open circuited. That is neither test tip lead 86 or ring lead 90 is then connected to a voltage source.

As the next step of this test, relay 67 of FIG. 6 is energized, and the 8-bit output 81 of ADC 66 is stored as the value $V_{cal}$.

As the next step of this test, relay 67 is de-energized, and the 8-bit output 81 of ADC is stored as the value $V_3$, while tip lead 86 and ring lead 90 remain open circuited.

As the next step of this test, tip lead 86 is connected to ground, ring lead 90 is connected to about minus 48 VDC, and ring lead 90 is open circuited, whereupon the 8-bit output 81 of ADC 66 (i.e., the ring voltage) is stored as the value $V_4$.

As the next step of this test, the ring-to-ground voltage is then calculated using the following formula.

Tip-to-ground voltage=$(V_3-V_{cal})-75(1-0.0075|V_4-V_3|)(V_4-V_3)$.

As the final step of this test, FIG. 10 relay 24 is de-energized and the test results are reported to the FIG. 5 GUI.

The above-described self tests and loop-tests do not require the assistance of an individual who is located at home or small business 12. That is, the above-described self tests and loop test can be run by one individual that is resident at FIG. 1 PC 21 or PC 25, and they do not require the assistance of a second individual that is resident at home/small business 12.

Assistant-required loop-tests comprise the above-mentioned tip-to-ring short assisted loop test, the above-mentioned tip open assisted loop test, and the above-mentioned ring open assisted loop test.

FIG. 11 is a figure similar to FIGS. 2, 8, 9, and 10 that shows a circuit configuration used to apply assistant required loop-tests to one of the eight FIG. 1 interface circuits 23 that is selected using the FIG. 5 GUI, this figure also showing an on-hook telephone 16 whose on hook/off hook switch 216 is shown in its open or on-hook condition.

Tip-to-Ring Short Assisted Loop Test:

With reference to FIG. 11, the tip-to-ring short assisted loop test of the invention requires that an on-site assistant hang up all telephones 16 that are attached to the twisted pair telephone line 15 that is connected to the GUI-selected interface circuit 23. That is, all devices within FIG. 1 home/small business 13, and that are connected to FIG. 11 telephone line 15, must be placed on hook.

In FIG. 11, this on-hook state of twisted pair 151/152 resistors 200 and 201 represent the resistance of the external tip and ring leads, respectively.

This tip-to-ring short assisted loop test detects the shorting of twisted pair 151/152; for example, by a nail or by another resistive short. In an embodiment of the invention, but without limitation thereto, the maximum detectable resistive short was about 6300 ohms.

As the first step of this test, tip lead 86 is grounded and ring lead 90 is connected to about minus 48 VDC. In this state, it is verified that interface circuit 23 is not reading loop closure of twisted pair 15.

As the final step of this test, the test results are reported to FIG. 5 GUI.

Tip Open Assisted Loop Test:

This assisted loop test requires an assistant who is on-site at home/small business 13 to attach a voltmeter between tip lead 151 and an available ground potential such as 37.

As a first step of this test, tip lead 86 is grounded and a potential of about minus 48 VDC is applied to ring lead 90. The assistant at home/small business 13 must then verify that approximately zero volts is present on tip lead 151.

As the next step of this test, ring lead 90 is grounded and a potential of about minus 48 VDC is applied to tip lead 86. The assistant at home/small business 13 must then verify that a potential between about minus 40 DVC and 56 VDC is present on tip lead 151.

In this test, the test results are not reported to FIG. 5 GUI. Rather, the assistant at home/small business 13 reports the test results.

Ring Open Assisted Loop Test:

This assisted loop test requires an assistant on-site at home/small business 13 to attach a voltmeter between ring lead 151 and an available ground potential such as 37.

As a first step of this test, tip lead 86 is grounded and a potential of about minus 48 VDC is applied to ring lead 90. The assistant at home/small business 13 must then verify that a potential between about minus 40 DVC and 56 VDC is present on ring lead 152.

As the next step of this test, ring lead 90 is grounded and a potential of about minus 48 VDC is applied to tip lead 86. The assistant at home/small business 13 must then verify that approximately zero volts are present on ring lead 152.

In this test, the test results are not reported to FIG. 5 GUI. Rather, the assistant at home/small business 13 reports the test results.

As previously stated, the above-described self test, loop-tests and assisted loop-tests are applied to only those interface circuits 23 and/or telephone lines 15 that are curser-selected using the "Status" column 55 of FIG. 5. As the selected tests are run on the selected interface circuits 23 and/or telephone lines 15, the remained of the interface circuits 23 and/or telephone lines 15 remain operatively connected to telephone exchange 11. Thus, telecommunications service is not interrupted to home/small business 12.

While the invention has been described while making reference to detailed embodiments of the invention, this detailed description is not to be taken as a limitation on the spirit and scope of the invention.

What is claimed is:

1. A telecommunications system comprising:
   a telephone exchange;
   a customer services terminal having an input connected to said telephone exchange, and having a plurality of outputs individually connected to one of a plurality of telephone lines;
   a plurality of interface circuits within said customer services terminal, each of said interface circuits being connected to one of said plurality of outputs;
   self-test means for testing said interface circuits;
   loop-test means for testing said telephone lines;
   a self-test relay responsive to said self-test means and operative during a self-test to disconnect said plurality of outputs from said plurality of telephone lines, and to provide self-test conditions to said interface circuits while said interface circuits are disconnected from said plurality of telephone lines;
   means responsive to said loop-test means, operative to provide loop-test conditions to said interface circuits while said plurality of interface circuits and said plurality of outputs remain connected to said plurality of telephone lines;
   selecting means for selecting certain of said interface circuits and/or certain of said telephone lines to which said self-test conditions and/or said loop-test conditions are to be applied, while a remainder of said interface circuits and/or a remainder of said telephone lines remain operative with said telephone exchange;
   a first tip lead and a first ring lead forming each of said plurality of telephone lines;
   a second tip lead and a second ring lead forming each of said plurality of outputs;

a first and second normally-closed self-test relay switch respectively operative to connect said first tip lead to said second tip lead and to connect said first ring lead to said second ring lead when said self-test relay is de-energized during a loop-test;

a first and second normally-open self-test relay switch respectively operative to disconnect said first tip lead from said second tip lead and to disconnect said first ring lead from said second ring lead when said self-test relay is energized during a self-test;

a loop start relay operative when energized during certain self-tests to connect a termination impedance from said second tip lead to said second ring lead; and a ground start relay operative when energized during other self-tests to connect said second ring lead to a source of ground potential as said second tip lead is maintained in a disconnected condition.

2. The telecommunication system of claim 1 including:

a plurality of over-current protection devices individually connected in series with each of said second tip leads and said second ring leads; and a plurality of over-voltage protection devices individually connected from each of said second tip leads to each of said second ring leads.

3. The telecommunications system of claim 2 wherein each of said over-voltage protection device is located adjacent to a corresponding interface circuit, and wherein each of said over-current protection devices is located to respond to a high current flow caused by operation of a corresponding over-voltage protection device.

4. The telecommunications system of claim 3 wherein:

said loop-tests include one or more of (1) testing for a short circuit between a selected first tip lead and a corresponding first ring lead, (2) testing for the connection of a selected first tip lead and/or a corresponding first ring lead to a voltage source that should not exist in said telecommunications system, (3) testing for the short-circuiting of a selected first tip lead to an associated first ring lead as is provided by simulating an off-hook condition of an associated telephone, and (4) testing for an open circuit of said a selected first tip lead and/or a corresponding first ring lead; and said self-tests include one of more of (1) testing for circuit continuity from a selected second tip lead to a corresponding second ring lead through a corresponding termination impedance, (2) testing for connection of a selected second ring lead to ground potential, (3) applying a test tone to a selected second ring lead and its corresponding tip lead and detecting a transmit gain and/or a receive gain of an associated interface circuit, (4) applying a test tone to a selected second ring lead and its corresponding tip lead and detecting a trans-hybrid loss of an associated interface circuit, and (5) applying a test tone to a selected second ring lead and its corresponding tip lead and detecting a ringing signal by an associated interface circuit.

5. A customer services terminal for use in a telecommunications system comprising:

an input for connection to a telephone exchange;

a plurality of outputs for individual connection to one of a plurality of telephone lines;

a plurality of interface circuits, each of said interface circuits being connected to one of said plurality of outputs;

self-test means for testing said interface circuits;

loop-test means for testing said telephone lines;

a self-test relay responsive to said self-test means and operative during a self-test to disconnect said plurality of outputs from the plurality of telephone lines and to provide self-test conditions to said interface circuits while said interface circuits are disconnected from the plurality of telephone lines;

means responsive to said loop-test means, operative to provide loop-test conditions to said interface circuits while said plurality of interface circuits and said plurality of outputs remain connected to the plurality of telephone lines;

selecting means for selecting certain of said interface circuits and/or certain of the telephone lines to which said self-test conditions and/or said loop-test conditions are to be applied, while a remainder of said interface circuits and/or a remainder of the telephone lines remain operative with the telephone exchange;

a first tip lead and a first ring lead forming each of the plurality of telephone lines;

a second tip lead and a second ring lead forming each of said plurality of outputs;

a first and second normally-closed self-test relay switch respectively operative to connect a first tip lead to a corresponding second tip lead and to connect a first ring lead to corresponding second ring lead when said self-test relay is deenergized during a loop-test;

a first and second normally-open self-test relay switch respectively operative to disconnect a first tip lead from a corresponding second tip lead and to disconnect a first ring lead from a corresponding second ring lead when said self-test relay is energized during a self-test;

a loop-start relay operative when energized during certain self-tests to connect a termination impedance from a second tip lead to a corresponding second ring lead; and a ground-start relay operative when energized during other self-tests to connect a second ring lead to a source of ground potential as a corresponding second tip lead is maintained in a disconnected condition.

6. The customer services terminal of claim 5 including:

a plurality of over-current protection devices individually connected in series with each of said second tip leads and said second ring leads; and a plurality of over-voltage protection devices individually connected from each of said second tip leads to each of said second ring leads.

7. The customer services terminal of claim 6 wherein each of said over-voltage protection device is located adjacent to a corresponding interface circuit, and wherein each of said over-current protection devices is located to respond to a high current flow caused by operation of a corresponding over-voltage protection device.

8. The customer services terminal of claim 7 wherein;

said loop-tests include one or more of (1) testing for a short circuit between a selected first tip lead and a corresponding first ring lead, (2) testing for the connection of a selected first tip lead and/or a corresponding first ring lead to a voltage source that should not exist in said telecommunications system, (3) testing for the short circuiting of a selected first tip lead to an associated first ring lead as is provided by simulating an off-hook condition of an associated telephone, and (4) testing for an open circuit of said selected first tip lead and/or a corresponding first ring lead; and said self-tests include one of more of (1) testing for circuit continuity from a selected second tip lead to a corresponding second ring lead through a corresponding termination impedance, (2) testing for connection of a selected second ring lead to ground potential, (3) applying a test tone to a selected second ring lead and its corresponding tip lead and detecting a transmit gain and/or a receive gain of an associated interface circuit, (4) applying a test tone to a selected second ring lead and its corresponding tip lead and detecting a transhybrid loss of an associated interface circuit, and (5) applying a test tone to a selected second ring lead and its corresponding tip lead, and detecting a ringing signal by an associated interface circuit.

* * * * *